United States Patent
Beck et al.

(10) Patent No.: US 9,441,752 B2
(45) Date of Patent: Sep. 13, 2016

(54) VALVE HOUSING AND ASSEMBLY UNIT COMPRISING A VALVE HOUSING AND METHOD OF MANUFACTURING A VALVE HOUSING

(71) Applicant: Buerkert Werke GmbH, Ingelfingen (DE)

(72) Inventors: Klaus Guenther Beck, Kuenzelsau (DE); Michael Adelmann, Bueschelhof (DE)

(73) Assignee: BUERKERT WERKE GMBH, Ingelfingen (DE)

( * ) Notice: Subject to any disclaimer, the term of this patent is extended or adjusted under 35 U.S.C. 154(b) by 171 days.

(21) Appl. No.: 13/923,054

(22) Filed: Jun. 20, 2013

(65) Prior Publication Data

US 2013/0341551 A1    Dec. 26, 2013

(30) Foreign Application Priority Data

Jun. 22, 2012    (DE) .......................... 10 2012 012 247

(51) Int. Cl.
   *F16K 27/02*    (2006.01)
   *F16K 27/00*    (2006.01)

(52) U.S. Cl.
   CPC .............. *F16K 27/00* (2013.01); *F16K 27/029* (2013.01); *F16K 27/0236* (2013.01); *F16K 27/0281* (2013.01); *F16K 27/003* (2013.01); *Y10T 29/49826* (2015.01)

(58) Field of Classification Search
   CPC .. F16K 27/00; F16K 27/003; F16K 27/0209; F16K 27/0236; F16K 27/0272; F16K 27/0281; F16K 27/029; F16K 27/102
   USPC ................ 251/366, 367; 137/315.27–315.32
   See application file for complete search history.

(56) References Cited

U.S. PATENT DOCUMENTS

| | | | | |
|---|---|---|---|---|
| 1,841,789 A | * | 1/1932 | Connolly | 137/270 |
| 2,301,176 A | * | 11/1942 | Elliott | 251/360 |
| 2,500,750 A | * | 3/1950 | Halenza | 251/120 |
| 2,609,175 A | * | 9/1952 | Von Kokeritz et al. | 137/543.19 |
| 2,869,221 A | * | 1/1959 | Siepmann | F16K 27/102 251/366 |
| 3,116,756 A | * | 1/1964 | Alderson | 137/875 |
| 3,275,292 A | * | 9/1966 | Boteler | 251/331 |
| 4,988,078 A | * | 1/1991 | Otteman | 251/367 |

(Continued)

FOREIGN PATENT DOCUMENTS

| | | |
|---|---|---|
| DE | 2809342 A1 | 9/1978 |
| DE | 10010367 B4 | 7/2004 |

(Continued)

OTHER PUBLICATIONS

German Patent Office, Search Report dated Feb. 28, 2013 for Application No. 102012012247.0, filed Jun. 22, 2012, 8 pages.

*Primary Examiner* — Mary McManmon
*Assistant Examiner* — Ian Paquette
(74) *Attorney, Agent, or Firm* — Schwabe Williamson & Wyatt

(57) ABSTRACT

A valve housing comprising an outer pipe section which is formed from a prefabricated pipe and has a connector for a valve actuator, and comprising an inner pipe section with a valve seat which represents a fluidic connection between the outer and inner pipe sections, is provided with a cut-out in the peripheral wall of the outer pipe section. At least a portion of the inner pipe section including the valve seat protrudes into the outer pipe section from outside the outer pipe section, the valve housing being fluid-tight in the region of the cut-out.

28 Claims, 5 Drawing Sheets

(56) References Cited

U.S. PATENT DOCUMENTS 5,370,354 A * 12/1994 Kunz ................ 251/30.02
5,896,884 A *  4/1999 Hettinger ............ 137/269
2012/0047978 A1  3/2012 Neumann et al.

FOREIGN PATENT DOCUMENTS

| DE | 102010023855 A1 | 12/2011 |
| EP | 1561982 A1 | 8/2005 |
| GB | 1597528 | 9/1981 |

* cited by examiner

VALVE HOUSING AND ASSEMBLY UNIT COMPRISING A VALVE HOUSING AND METHOD OF MANUFACTURING A VALVE HOUSING

FIELD OF THE INVENTION

The invention relates to a valve housing comprising an outer pipe section which is formed from a prefabricated pipe and has a connector for a valve actuator. The invention further relates to an assembly unit comprising such a valve housing and a valve actuator as well as to a method of manufacturing a valve housing.

BACKGROUND

A valve assembly for a pipe system comprises a valve housing with at least two pipe sections to which a pipeline can be connected in each case, as well as a valve seat which is arranged between the pipe sections and against which a valve element can be moved to selectively interrupt the fluid path between the pipe sections. The valve assembly further comprises a valve actuator which can be mounted to a connector of the valve housing and moves the valve element against the valve seat. The valve actuator is a linear drive displacing the valve element in a linear motion against the valve seat. Thus, the valve seat has to be designed or aligned such that the valve element can be moved in a linear motion against the valve seat.

The manufacture of such housings with a casting method is expensive as either a mold with sliders for the channels is required or the channels have to be drilled or milled after the casting of the valve housing. Moreover, casting methods often result in an undesired shrinkage cavity due to a lack of homogeneity of the microstructure. A further disadvantage is the high consumption of material in the case of a machining process.

For that reason, valve housings of this type are often made from pipe sections which are assembled to a valve housing. From DE 10 2010 023 855 A1 there is known, for instance, a valve housing made from a pipe section, with a recess being formed on one side of the pipe section where a valve actuator can be installed. The side of the pipe section opposite the recess is formed towards inside to result in a web for the formation of a valve seat, the web being approximately in one plane with the recess. A membrane which rests against the recess and can be pressed against the web by a valve actuator provides for a fluid-tight separation of the pipe sections. With this known procedure, valve housings can be manufactured in which the valve seat is designed as a web. Other valve seat geometries such as one with a circular sealing contour, for example, where the valve seat is surrounded by an annular space, can not be manufactured with this method.

A further valve housing is known from EP 1 561 982 A1. In this valve housing, two pipes each having pipe sections extending in a right or acute angle relative to each other, are joined in a connection area and are connected in fluidic terms through a recess. In this valve housing, the recess defines the valve seat, whereby the position of the valve seat and hence the position and the actuation direction of the valve actuator can not be changed as desired. This method has the disadvantage that there is the need to weld housing parts directly on the valve seat. This bears the risk of damaging the valve seat which would result in a leakage in the valve.

The invention provides a valve housing which can be manufactured in a simpler and more cost-efficient way and is able to be flexibly adapted to the installation conditions.

SUMMARY

The valve housing according to the invention comprises an outer pipe section which is formed from a prefabricated pipe and has a connector for a valve actuator, and comprising an inner pipe section including a valve seat which represents a fluidic connection between the outer pipe section and the inner pipe section, is provided with a cut-out in the peripheral wall of the outer pipe section. At least a portion of the inner pipe section including the valve seat protrudes into the outer pipe section from outside the outer pipe section, the valve housing being fluid-tight in the region of the cut-out.

According to the invention, the valve housing comprises two pipe sections which each are formed from a prefabricated, i.e. already finished pipe, which are partially inserted into each other. The valve seat is provided on an inner pipe section. The connector for the valve actuator is provided on an outer pipe section. The valve seat and the connector may be positioned on the respective pipe section as desired, by forming the pipe sections in a corresponding manner. The connector on the outer pipe section merely has to be designed such that the valve actuator can be mounted to the outer pipe section and is able to move a valve element within the outer pipe section against the valve seat. This valve housing composed of two pipes can be manufactured in a simple manner, as the two pipe sections each formed by a pipe can be made separately from each other and then mounted to each other, for instance by sealing the cut-out through welding or soldering, with the pipe sections being able to be connected to each other by means of a material bond.

The end of the inner pipe segment situated in the outer pipe segment advantageously protrudes with respect to the inner side of the outer pipe segment.

The valve seat can be formed by the inner pipe segment itself. As an alternative to this, a ring may be fastened to the end of the inner pipe segment in order to create the valve seat.

Other than in prior art, an annular channel is formed according to the invention between the inner and outer ring segments. This annular channel extends externally around a ring-shaped valve seat. Fluid flows via the annular channel from the outer ring segment into the inner ring segment or vice versa. Thus, there is no need to carry out a forming process to achieve a web as disclosed in DE 10 2010 023 855 A1.

The housing according to the invention is preferably made of metallic pipe segments, e.g. of stainless steel.

The valve seat of the inner pipe section may be formed, for instance, by the edge or on the edge of the pipe end of the inner pipe section, said pipe end protruding into the outer pipe section. In this embodiment, there is no need to provide additional recesses for the valve seat on the inner pipe section so that manufacture and assembly of the valve housing are simplified. Prior to it being mounted to the outer pipe section, the inner pipe section can be formed such that the valve seat has a corresponding orientation. By cutting off the pipe end in straight fashion, in particular by cutting it perpendicular to its center line, it is also possible to provide a planar contact surface for the valve seat in a simple manner so that sealing the valve seat is simplified.

The connector for the valve actuator may be formed by the edge of a free pipe end of the outer pipe section so that no additional recesses or cut-outs for the connector of the valve actuator are required on the outer pipe section; moreover, sealing the free pipe end is not necessary. Analogous to the inner pipe section, the free end of the outer pipe section comprises a planar connector face, in particular a connector face which is arranged perpendicular to its center line.

The valve seat can be arranged in a plane extending parallel to the plane in which the connector for the valve actuator is arranged so that the valve actuator can shift the valve element vertically against the valve seat. The valve seat and the connector are arranged especially so as to be concentric to each other as seen perpendicular to the planes defined by them, i.e. they have a common center line so that the valve actuator centrically arranged in the connector can move the valve element centrally against the valve seat.

The valve seat and the connector for the valve actuator may also lie in a common plane, in particular concentrically with respect to each other.

The cut-out is closed in a fluid-tight manner for instance by welding or soldering, whereby the outer and inner pipe sections are connected to each other in the form of a material bond, as an alternative or in addition also through a form-fitting connection so that the position of the inner pipe section is fixed in the outer pipe section.

A centering element may be provided between the part of the inner pipe section situated in the outer pipe section, and the outer pipe section, this centering element determining the position of the valve seat relative to the outer pipe section. This centering element may fix the position of the inner pipe section during assembly, i.e. prior to closing the cut-out in a fluid-tight manner, and/or may stabilize the inner pipe section in the outer pipe section after assembly.

In order to determine the position of the valve seat in the outer pipe section in a reliable fashion so as to allow a trouble-free function of the valve actuator, the centering element is e.g. provided on the valve seat.

The centering element may be defined, for instance, by a ring which has through-flow openings, surrounds the inner pipe section in circumferential direction and rests against the inner surface of the outer pipe section. This allows for simply centering the inner pipe section and the valve seat in the middle of the outer pipe section, without affecting the through-flow of the fluid in the open state of the valve.

The pipe sections may extend linearly and be arranged, for instance, at an angle relative to each other in order to bring the inner pipe section out of the outer pipe section.

The at least one pipe section can be formed or bent so that the inner pipe section extends out of the outer pipe section after a length which is as short as possible and the valve housing can be realized with the most compact design.

At least one pipe section is mechanically formed, for instance by internal high-pressure forming or another suitable forming method. In addition, the forming process allows the alignment of the valve seat and the connector for the valve actuator relative to each other.

A reinforcing element, e.g. a reinforcing metal sheet may be provided between the inner and outer pipe sections on the outside thereof, this reinforcing element defining the position of the pipe sections as well as the mutual position of the valve seat and of the connector for the valve actuator and also stabilizing the valve housing.

The ends of the outer pipe section and inner pipe section which are opposite the valve actuator and the valve seat can be adapted, in particular formed as desired depending on the desired run of the pipeline in which the valve housing is inserted. The ends of outer and inner pipe section which are opposite the valve actuator and the valve seat, respectively, are arranged for instance so as to point in opposite directions; here, the edges of the ends may be arranged in parallel planes and the ends may be arranged in particular so as to be concentric to each other. This allows the insertion of the valve housing in a pipeline with straight extension.

The center lines of the outer and/or inner pipe sections may also extend in the shape of an arc, for example, in the shape of an arc through 90 degrees. In this embodiment, the valve actuator and the valve seat as well as the connector are arranged perpendicular to the run of the pipe so that the connector and the valve actuator can be easily accessed.

The cut-out in the outer pipe section may be provided, for example, in the outer area of the curvature of the outer pipe section.

However, the valve housing may also be a Y-type valve housing in which the outer pipe section is V-shaped, i.e. has pipe legs extending in an acute angle relative to each other, and comprises a cut-out in the transition area of the legs, with the cut-out being arranged coaxially to one of the legs.

In order to meet the object, provision is further made of an assembly unit comprising a valve housing according to the invention and a valve actuator, the plane of the valve seat and/or of the connector being perpendicular to the operating direction of the valve.

The method of the invention for manufacturing the illustrated valve housing provides the following steps:

Two pipes of differing diameter are cut to length and formed for the formation of the pipe segments, a cut-out is made in the larger pipe segment, one end of the smaller pipe is inserted through the cut-out into the larger pipe so as to partially protrude into the outer pipe, and is fastened to the edge of the cut-out.

DETAILED DESCRIPTION

Figure 1:
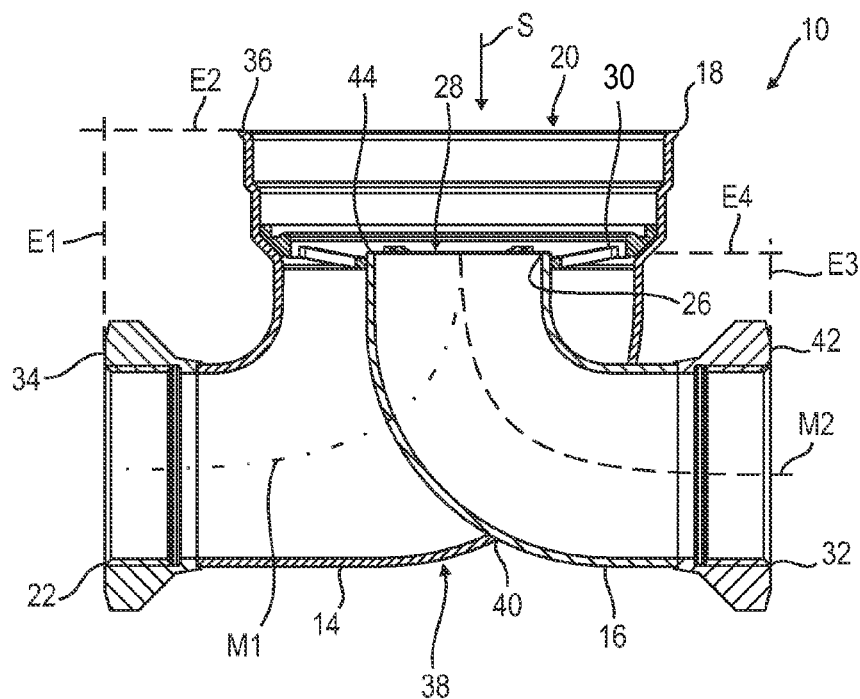
FIG. 1 is a sectional view through a first embodiment of a valve housing according to the invention.
Figure 2:
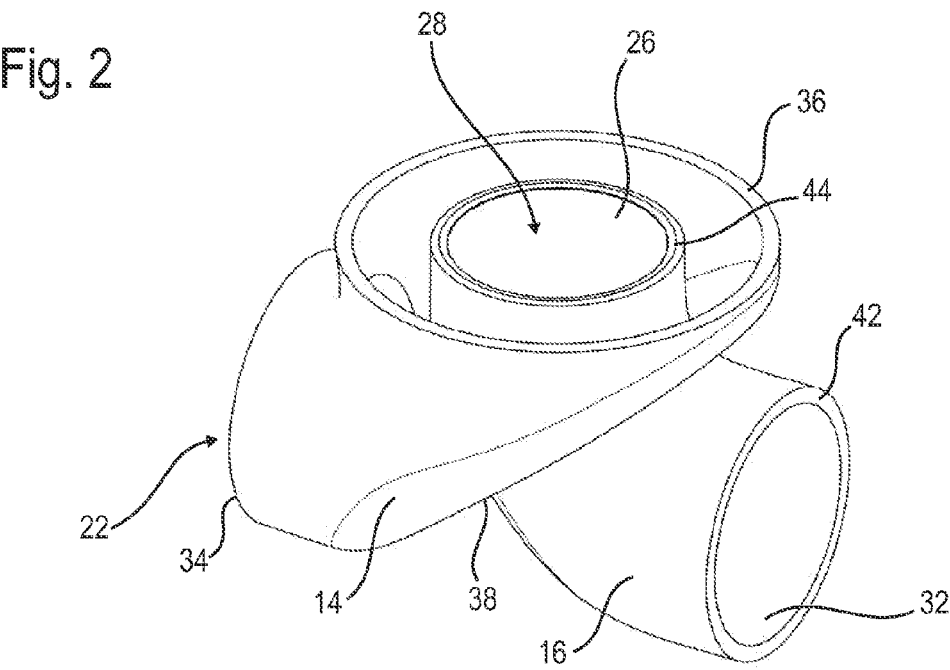
FIG. 2 is a perspective view of the valve housing of FIG. 1.
Figure 4:
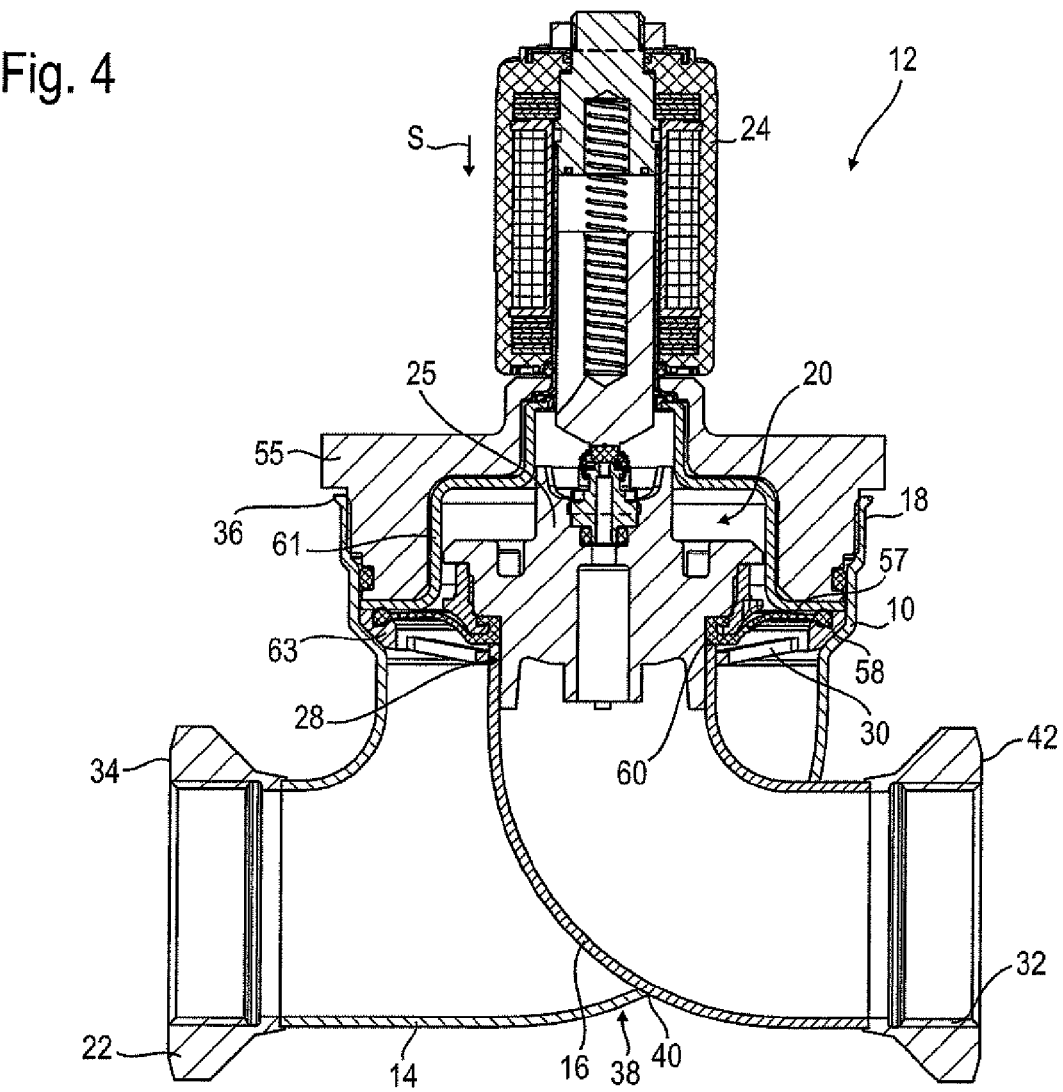
FIG. 4 shows a valve assembly according to the invention comprising the valve housing of FIG. 1.
Figure 5:
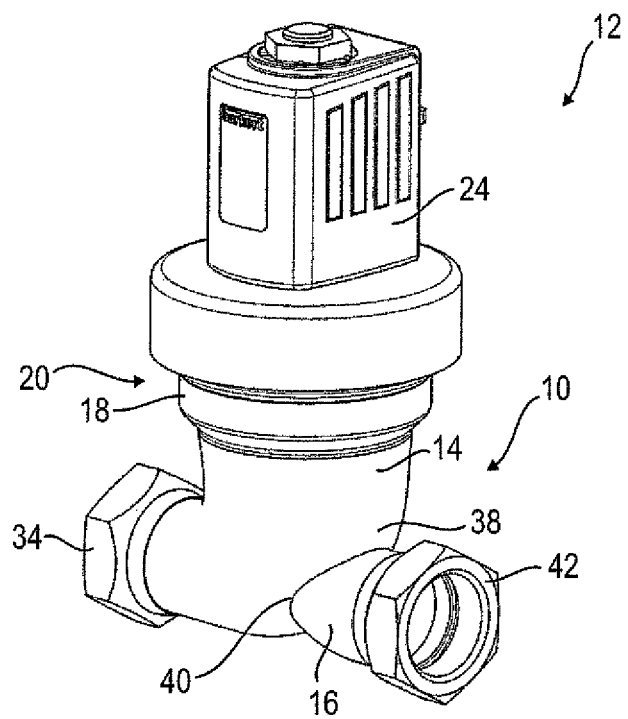
FIG. 5 is a perspective view of the valve assembly of FIG. 4.

FIGS. 1 and 2 show a valve housing 10 for a valve assembly 12 shown in FIGS. 4 and 5.

The assembly unit 12 can be inserted in a linear pipeline and is able to regulate the flow of a fluid through this pipeline.

To this end, the assembly unit 12 further comprises an e.g. electromagnetic valve actuator 24 (see FIG. 4) which is able to linearly move a valve element 25 (also referred to as valve body), coupled to an armature, in the valve housing 10 and which is mounted to the valve housing 10 as will be explained below.

As can be seen in particular in FIG. 1, the valve housing 10 comprises an outer pipe section 14 as well as an inner pipe section 16, which are each made from a part of a prefabricated pipe.

A first pipe end 18 of the outer pipe section 14 is designed as a connector 20 for a valve actuator 24 (see also FIGS. 4 and 5) and comprises retaining means, e.g. by means of shoulders, for the valve actuator 24. The second pipe end 22 of the outer pipe section 14 forms a pipe connection for the pipeline.

The first, inner pipe end 26 of the inner pipe section 16 forms a valve seat 28 against which a valve element 25 (see FIG. 4) can be moved in order to seal off the outer pipe section 14 with respect to the inner pipe section 16. The second, outer pipe end 32 of the inner pipe section 16 likewise forms a pipe connection for a pipeline.

The outer pipe section 14 is formed by a bent pipe section, with the center line M1 of the outer pipe section extending over 90 degrees in the shape of an arc (see FIG. 1). The edge 34 of the first pipe end 18 as well as the edge 36 of the second pipe end 22 extend in a plane E1 and E2, respectively, these planes E1, E2 enclosing an angle of approximately 90° in the embodiment which is shown here.

The first pipe end 18 of the outer pipe section 14 advantageously has a larger diameter on the side of the connector 20 than on the side of the pipe end 22. Enlarging the diameter can be effected as an expansion of the pipe section through internal high-pressure forming.

In the area 38 of the outer curvature of the arc, a cut-out 40 is provided in the outer pipe section 14, through which the inner pipe section 16 protrudes into the outer pipe section 14 from outside.

The inner pipe section 16 is also bent, so that the center line M2 of the inner pipe section 16 extends in the shape of an arc across approximately 90 degrees and the planes E3, E4 of the edges 42, 44 of the pipe ends 26, 32 form a right angle.

The first pipe end 26 or the valve seat 28 of the inner pipe section 16 extends through the cut-out 40 from outside into the outer pipe section 14.

In the embodiment shown here, the planes E2, E4 of the edges 34, 42 of the inner pipe section 16 and of the outer pipe section 14 are parallel to each other, but they may also have another orientation. The cut-out 40 is fluid-tight with respect to the inner pipe section 16.

The outer pipe section 14 as well as the inner pipe section 16 can be adapted by any forming method, for instance by internal high-pressure forming and/or another mechanical forming method.

Figure 3:
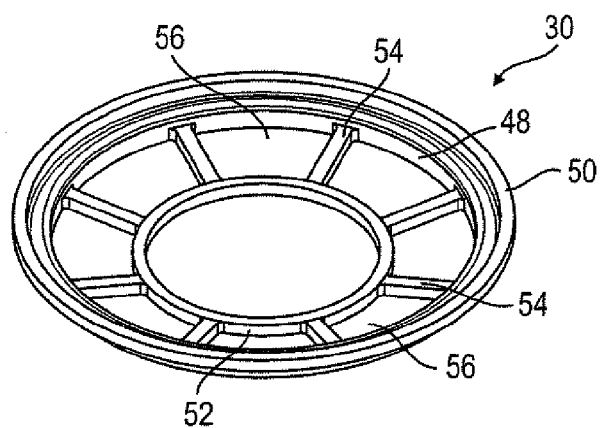
FIG. 3 shows a centering element for use in the valve housing of FIG. 1.

Furthermore, a centering element 30 shown in detail in FIG. 3 is provided in the outer pipe section 14, this centering element fixing the valve seat 28 of the inner pipe section 16 in the outer pipe section 14 and coaxially centering it with respect to the connector 20 of the valve actuator 24.

The centering element 30 is formed by an outer ring 48 having a shoulder 50, and by an inner ring 52, which are connected through several webs 54. Formed between the outer ring 50 and the inner ring 52 are several through-flow openings 56 through which the fluid can flow.

By means of a housing 55, the valve actuator 24 is fastened to and in the connector 20 such that the actuation direction S of the valve actuator is perpendicular to the plane E4 of the edge 34 and perpendicular to the valve seat 28.

The valve element 25 can be moved against the valve seat 28. The valve element 25 is coupled to a ring-shaped membrane 57 which has its outer edge 58 firmly coupled to the housing 55 along the circumference, e.g. via retaining parts 61, 63. Through an inner edge 60, the membrane 57 is circumferentially fastened to the valve element 25 so that the membrane 57 can be lifted off from the valve seat 28 or is pressed against it through a movement of the valve element 25.

In the open state of the assembly unit 12, the inner edge 60 does not rest against the valve seat 28 so that a fluid may flow from the outer pipe section 14 laterally via the valve seat 28 into the inner pipe section 16.

In order to close the valve assembly 12, the valve actuator 24 is moved in the actuation direction S so that the inner edge 60 of the valve element 25 is pressed against the valve seat 28 and the valve element 25 has a circumferential contact with the valve seat 28. This causes the inner pipe section 16 to be separated from the outer pipe section 14 in fluidic terms so that fluid can not flow from the outer pipe section 14 into the inner pipe section 16.

As the planes E2, E4 of the valve seat 28 and of the connector 20 are parallel to each other and the valve seat 28 as well as the connector 20 are arranged to be concentric to each other, the valve element 25 can be moved against the valve seat 28 by a simple, linear movement of the actuator 24 in actuation direction S.

Thus, the valve housing 10 according to the invention is composed of pipes which form two pipe sections 14, 16 and in the embodiment shown here are bent at right angles, a cut-out for the inner pipe section 16 being provided in the outer pipe section 14, which inner pipe section partially protrudes into the outer pipe section 14 so that the valve seat 28 is situated within the outer pipe section 14. As a consequence, only two pipes which are inserted into each other are required for the housing.

The manufacture of such a valve housing 10 is very simple and cost-efficient, as the pipe sections 14, 16 can be individually prefabricated by cutting pipes to length and forming them. The pipe sections 14 and 16 merely have to be inserted into each other and after that the cut-out 40 towards the inner pipe section 16 has to be sealed. This may be carried out, for example, by a material bonding method such as welding, soldering or gluing, and/or by a form-fitting method whereby also a mutual fixation of the pipe sections 14, 16 takes places.

In the course of and after the assembly, the centering element 30 fixes the valve seat 28 centrically relative to the connector 20 of the valve actuator 24 so that these parts are retained during and after insertion of the inner pipe section 16.

As the free end of the outer pipe section 14 forms the connector 20 for the valve actuator 24 and the free pipe end 26 of the inner pipe section 16 forms the valve seat 28, there is no need to additionally seal them so that the construction of the valve housing 10 and its manufacture are further simplified.

As an alternative to this, it would also be possible to put a ring onto the free end of the inner pipe section 16; then, it is this ring which will form the valve seat 28.

It is also not necessary that the valve seat 28 is formed by a free pipe end 26 of the inner pipe section 16, i.e. its end face. The valve seat 28 could also be formed on the wall of the inner pipe section 16 which is within the outer pipe section. Likewise, the connector 20 for the valve actuator need not be formed by the free pipe end 18 of the outer pipe section 14.

It is preferred that the planes of the valve seat 28 and of the connector 20 are arranged so as to be parallel and in particular concentric to each other so that a valve element such as a membrane can be moved against the valve seat through a straight-line movement of the valve actuator 24. Instead of a membrane, a tappet may also be pressed against the valve seat to close the free end of the inner pipe section.

It is especially conceivable that the valve seat 28 and the connector 20 extend in one plane relative to each other. The valve seat 28 and the connector 20, however, may also have any mutual orientation depending on the actuation direction S or the valve actuator 24. It only has to be ensured that the valve actuator 24 is able to move a valve element 25 towards the valve seat 28.

Figure 6:
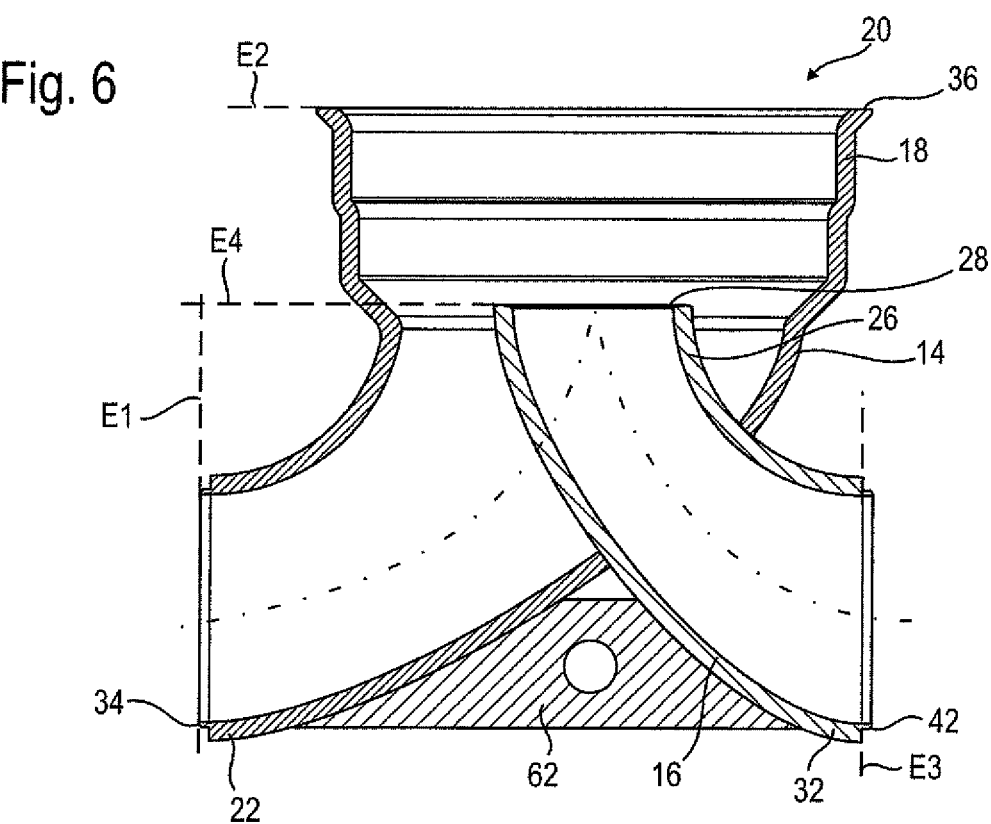
FIG. 6 is a sectional view of a second embodiment of a valve housing according to the invention.
Figure 7:
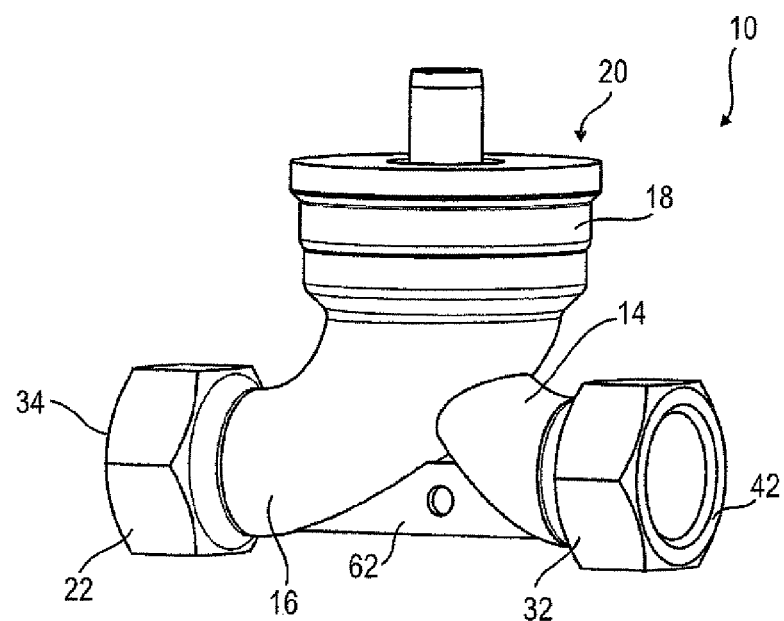
FIG. 7 is a perspective view of the valve housing of FIG. 6.

A second embodiment of a valve housing 10 according to the invention is shown in FIGS. 6 and 7. The construction of this valve housing essentially corresponds to the one of the valve housing shown in FIGS. 1 and 2. In addition thereto, a supplementary reinforcing metal sheet 62 is provided with which the inner pipe section 16 is externally fixed to the outer pipe section 14 so that the pipe sections 14, 16 are prevented from being shifted relative to each other. Moreover, the reinforcing metal sheet 62 can be used for fastening the valve housing 10.

The free pipe ends 22, 32 can be aligned as desired, for example depending on the laying of the pipeline to which the valve housing 10 is to be attached.

In the embodiments shown in FIGS. 1 and 2 or 6 and 7, the free pipe ends 22, 32 are arranged in such a manner that they point in opposite directions and extend parallel to each other so that the valve housing 10 may be inserted in a linear pipe.

Figure 8:
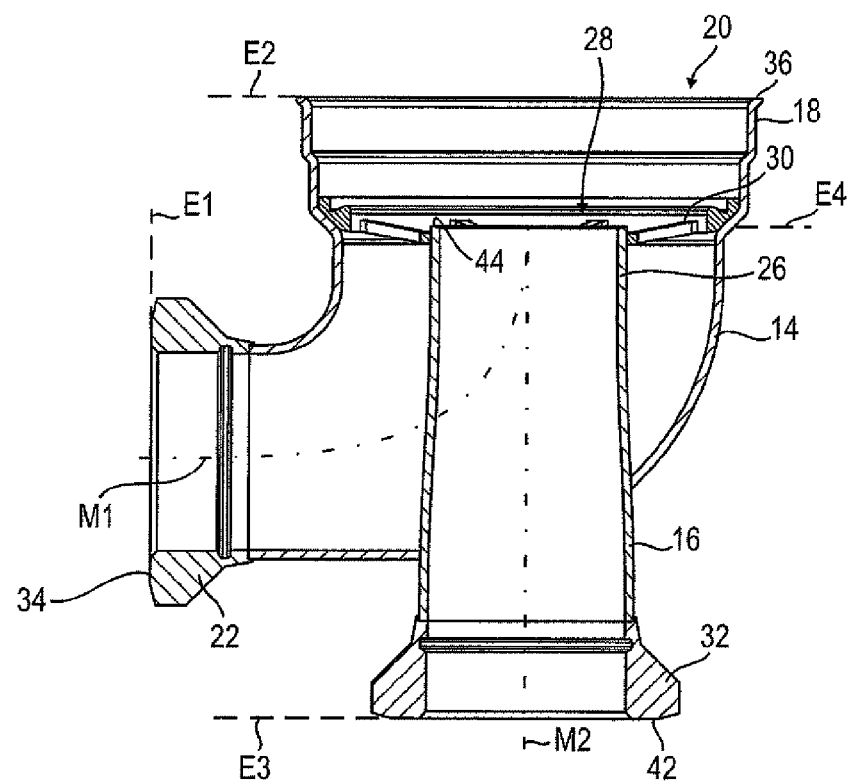
FIG. 8 is a sectional view through a third embodiment of a valve housing according to the invention.

A third embodiment of a valve housing 10 according to the invention is shown in FIG. 8. In this embodiment, only the outer pipe section 14 is bent so as to be right-angled, whereas the inner pipe section 16 extends linearly, i.e. is not formed. Thus, the planes E1, E3 of the pipe ends 22, 32 are perpendicular to each other so that the pipe connections are arranged perpendicular to each other.

Figure 9:
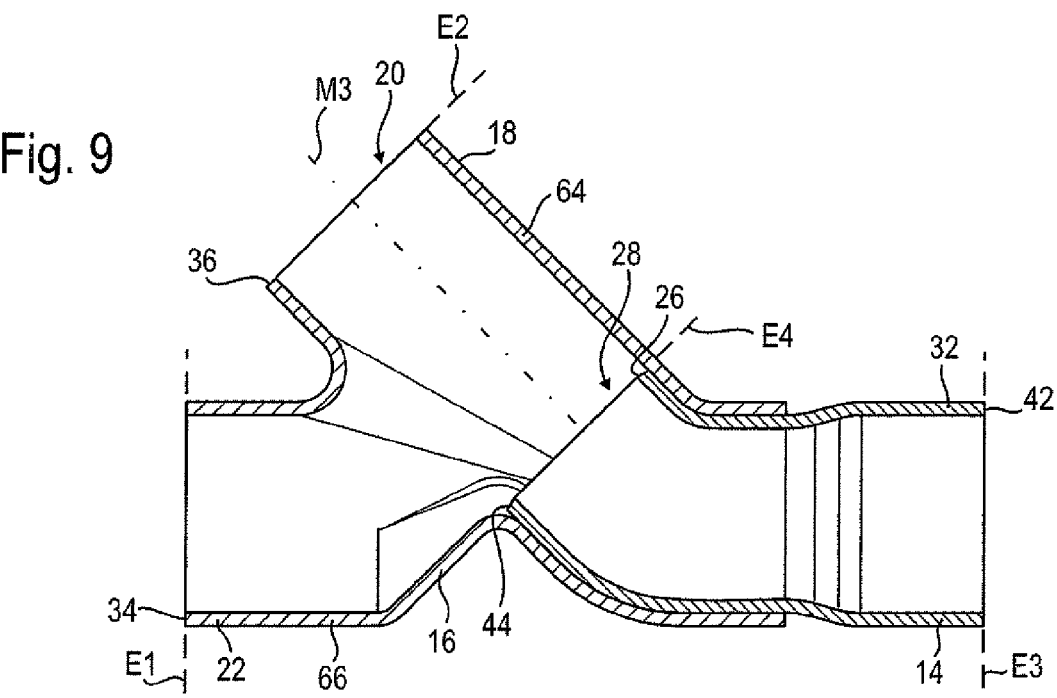
FIG. 9 is a sectional view through a fourth embodiment of a valve housing according to the invention.
Figure 10:
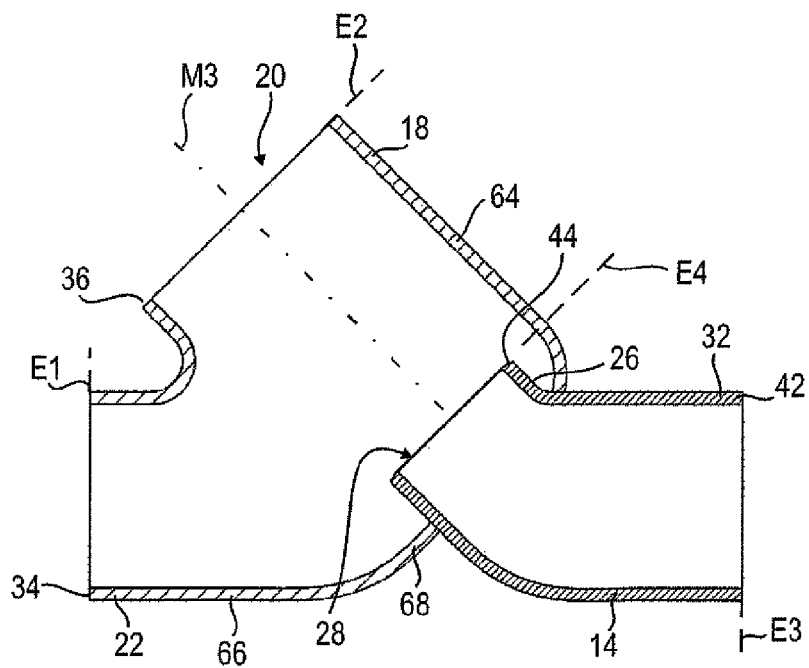
FIG. 10 is a sectional view through a fifth embodiment of a valve housing according to the invention.

In the embodiments shown in FIGS. 9 and 10, the pipe ends 22, 32 are each arranged opposite each other. Other than in the embodiments shown above, the valve housing 10 is a Y-type valve housing here, and the outer pipe section 14 has two pipe legs 64, 66 extending in V-shape relative to each other and enclosing an acute angle between them.

In these embodiments, the cut-out 40 is arranged in the transition area 68 between the pipe legs 64, 66. The cut-out 40 and the inner pipe section 16 are designed such that the plane of the valve seat 28 is perpendicular to the center line M3 of the first pipe leg 64 where the connector 20 for the valve actuator is provided so that the actuation direction S of the valve actuator is perpendicular to the plane of the valve seat 28.

Basically and without being limited to a single embodiment, the inner pipe section 16 may have a slightly tapering shape towards the interior end, at least in the region of the cut-out 40. This ensures that the pipe sections are clamped at the cut-out 40 already before the fastening process and independently of the tolerances of the cut-out 40.

With the housing according to the invention, the end of the inner pipe segment situated in the outer pipe segment advantageously protrudes with respect to the inner side of the outer pipe segment (except for FIG. 9).

In the invention, without being limited to a single embodiment, an annular channel is formed between the inner and outer ring segments in contrast to prior art. This annular channel extends externally around a ring-shaped valve seat. Fluid flows via the annular channel from the outer ring segment into the inner ring segment or vice versa.

The method of manufacturing the illustrated valve housing provides the following steps:

Two pipes of differing diameter are cut to length and formed for the formation of the pipe segments, a cut-out is made in the larger pipe segment, one end of the smaller pipe is inserted through the cut-out into the larger pipe so as to partially protrude into the outer pipe, and is fastened to the edge of the opening.

The invention claimed is:

1. A valve housing, comprising:
    an outer pipe section which is formed from a prefabricated pipe and has a connector for a valve actuator, wherein the outer pipe section comprises an integral bent pipe section, and a diameter of the outer pipe section which is formed by bending the prefabricated pipe enlarging towards the connector for the valve actuator;
    an inner pipe section including a valve seat which represents a fluidic connection between the outer pipe section and the inner pipe section; and
    a cut-out provided in a curved portion of the integral bent pipe section, at least a portion of the inner pipe section including the valve seat protruding through the cut-out into the outer pipe section from outside the outer pipe section, the valve housing being fluid-tight in the region of the cut-out.

2. The valve housing according to claim 1, wherein the valve seat is formed at an edge of a free pipe end of the inner pipe section protruding into the outer pipe section.

3. The valve housing according to claim 1, wherein the valve seat is arranged in a plane which extends parallel to the plane in which the connector for the valve actuator is arranged.

4. The valve housing according to claim 1, wherein the valve seat and the connector, as seen perpendicular to the planes defined by the valve seat and the connection, being arranged so as to be concentric to each other.

5. The valve housing according to claim 1, wherein the valve seat and the connector for the valve actuator are arranged in a common plane and are arranged concentrically to each other.

6. The valve housing according to claim 1, wherein the inner pipe section is deformed.

7. The valve housing according to claim 1, wherein a reinforcing element is provided outside the pipes between the inner pipe section and the outer pipe section.

8. The valve housing according to claim 1, wherein the pipe ends of the outer and inner pipe sections opposite to the valve actuator point in opposite directions.

9. The valve housing according to claim 1, wherein the valve housing is a Y-type valve in which the outer pipe section comprises pipe legs with V-shaped design as well as a cut-out in a transition area of the pipe legs, the cut-out being aligned so as to be parallel to one of the pipe legs.

10. The valve housing according to claim 1, wherein the connector for the valve actuator is present on an edge of a free pipe end of the outer pipe section.

11. The valve housing according to claim 10, wherein retaining means for the valve actuator are provided on the edge of the free pipe end of the outer pipe section.

12. The valve housing according to claim 1, wherein a centering element is provided between the outer pipe section and the part of the inner pipe section which is situated in the outer pipe section, said centering element determining the position of the valve seat relative to the outer pipe section.

13. The valve housing according to claim 12, wherein the centering element is provided on the valve seat.

14. The valve housing according to claim 12, wherein the centering element is defined by a ring which has through-flow openings, surrounds the inner pipe section in circumferential direction and rests against the inner surface of the outer pipe section.

15. The valve housing according to claim 1, wherein the center line of the outer pipe section extends in the shape of an arc.

16. The valve housing according to claim 15, wherein the cut-out is provided in an outer area of the curvature of the arc.

17. The valve housing of claim 1, wherein the inner pipe section comprises an integral bent pipe section which is formed by bending a prefabricated pipe having a smaller diameter than the prefabricated pipe associated with the outer pipe section, and wherein a curved portion of the integral bent pipe section of the inner pipe section intersects the cut-out.

18. The valve housing of claim 17, wherein one or both of the inner pipe section and the outer pipe section comprise a circumferentially closed cross-section at the integral bent pipe sections.

19. A valve housing, comprising:
an outer pipe section which is formed from a prefabricated pipe and has a connector for a valve actuator, wherein the outer pipe section comprises an integral bent pipe section which is formed by bending the prefabricated pipe;
an inner pipe section including a valve seat which represents a fluidic connection between the outer pipe section and the inner pipe section; and
a cut-out provided in a curved portion of a peripheral wall of the integral bent pipe section, at least a portion of the inner pipe section including the valve seat protruding through the cut-out into the outer pipe section from outside the outer pipe section, the valve housing being fluid-tight in the region of the cut-out, and the valve seat and the connector for the valve actuator being arranged in a common plane and concentrically to each other.

20. The valve housing according to claim 19, wherein the valve seat is formed at an edge of a free pipe end of the inner pipe section protruding into the outer pipe section.

21. The valve housing according to claim 19, wherein the connector for the valve actuator is present on an edge of a free pipe end of the outer pipe section.

22. A valve housing, comprising:
an outer pipe section which is formed from a prefabricated pipe and has a connector for a valve actuator, wherein the outer pipe section comprises an integral bent pipe section which is formed by bending the prefabricated pipe;
an inner pipe section including a valve seat which represents a fluidic connection between the outer pipe section and the inner pipe section;
an opening provided in a curved portion of a peripheral wall of the integral bent pipe section, at least a portion of the inner pipe section including the valve seat protruding through the opening into the outer pipe section from outside the outer pipe section, the valve housing being fluid-tight in the region of the opening; and
an integral centering element between the outer pipe section and a part of the inner pipe section which is situated in the outer pipe section, said centering element determining the position of the valve seat relative to the outer pipe section.

23. The valve housing according to claim 22, wherein the centering element is provided on the valve seat.

24. The valve housing according to claim 22, wherein the centering element is defined by a ring which has through-flow openings, surrounds the inner pipe section in circumferential direction and rests against an inner surface of the outer pipe section.

25. A valve housing, comprising:
an outer pipe section which is formed from a prefabricated pipe and has a connector for a valve actuator, wherein the outer pipe section comprises an integral bent pipe section which is formed by bending the prefabricated pipe;
an inner pipe section including a valve seat which represents a fluidic connection between the outer pipe section and the inner pipe section;
an opening provided in a curved portion of the integral bent pipe section, at least a portion of the inner pipe section including the valve seat protruding through the opening into the outer pipe section from outside the outer pipe section, the valve housing being fluid-tight in the region of the opening, the connector for the valve actuator being present on an edge of a free pipe end of the outer pipe section; and
several retaining means for the valve actuator being provided on the edge of the free pipe end of the outer pipe section, the retaining means being formed as shoulders wherein the shoulders have different diameters such that the connector expands towards the free end of the outer pipe section.

26. An assembly unit comprising the valve housing according to claim 25 and comprising the valve actuator, a plane of at least one of the valve seat and of the connector for the valve actuator being arranged perpendicular to an operating direction of the valve.

27. The assembly unit according to claim 26, wherein the valve actuator is connected to the connecter via at least one of the shoulders.

28. A method of manufacturing a valve housing according to claim 1, comprising:
cutting two pipes of differing diameter to length, wherein a smaller diameter pipe is cut to form the inner pipe section and a larger diameter pipe is cut to form the outer pipe section;
bending the larger diameter pipe to form the integral bent pipe section;
enlarging the diameter of the larger diameter towards a first pipe end;
forming an opening in the curved portion of the integral bent pipe section to provide the cut-out;
inserting one end of the smaller diameter pipe through the opening into the larger diameter pipe so as to partially protrude into the larger diameter pipe; and
fastening the inserted end of the smaller diameter pipe to the edge of the opening.

* * * * *